E. GARVEY.
PREDETERMINED BULK LIQUID DISPENSER.
APPLICATION FILED MAR. 12, 1917.
1,297,458.
Patented Mar. 18, 1919.
2 SHEETS—SHEET 1.
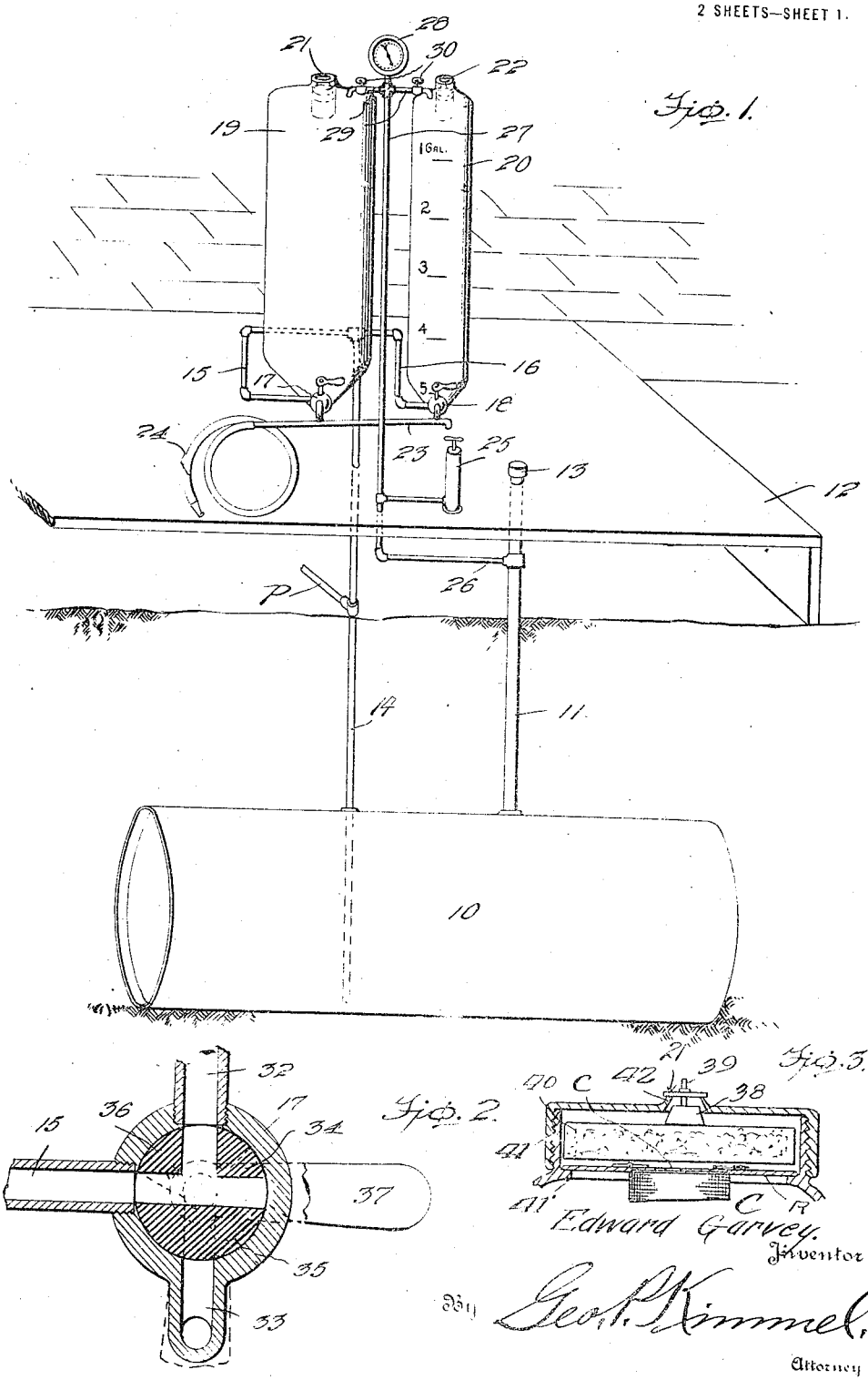
Edward Garvey,
Inventor
Geo. P. Kimmel,
Attorney

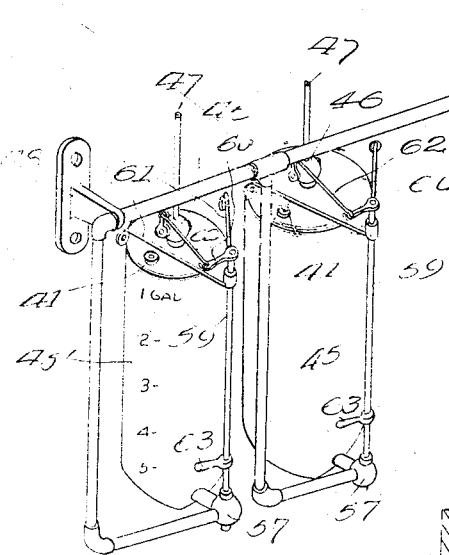
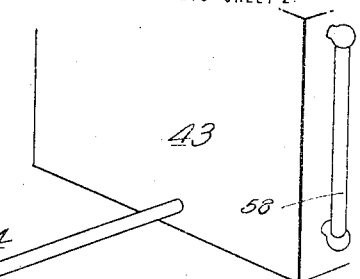
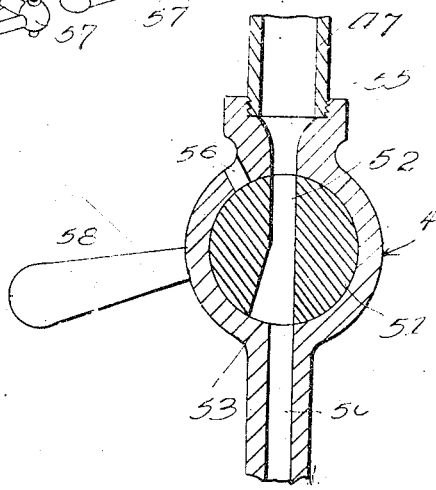

UNITED STATES PATENT OFFICE.

EDWARD GARVEY, OF FARMINGTON, MINNESOTA.

PREDETERMINED-BULK LIQUID-DISPENSER.

1,297,458.  Specification of Letters Patent.  Patented Mar. 18, 1919.

Application filed March 12, 1917. Serial No. 154,309.

*To all whom it may concern:*

Be it known that I, EDWARD GARVEY, a citizen of the United States, and resident of Farmington, in the county of Dakota and State of Minnesota, have invented certain new and useful Improvements in Predetermined-Bulk Liquid-Dispensers, of which the following is a specification.

The present invention relates to the art of dispensing and has particular reference to new and useful improvements in pre-determined bulk liquid dispensing devices.

An object of my invention is to provide in a novel, compact and cheaply constructed liquid dispenser a novel and improved device for dispensing liquid in pre-determined fixed quantities in a quick and accurate manner.

Another object of my invention is to provide a liquid dispenser having an arrangement of measuring containers of varying sizes, a supply tank, means for forcing the liquid therefrom, and arrangement of valves to control communication between the supply tank and said measuring containers.

A further object of my invention is to provide an improved type of valve for connecting the measuring devices with the supply tank to receive liquid therefrom and then closing communication between the supply tank and said containers to permit the contents of the measuring containers to flow therefrom.

A still further object of my invention is to provide a dispensing device having means to indicate the contents of the supply tank, this being employed in a gravity system embodying the modified form of my invention.

Other objects and advantages to be derived from the use of my improved liquid dispensing device will appear from the following detailed description and the claims, taken with an inspection of the accompanying drawings, in which:

Figure 1 is a perspective view of a dispenser embodying the improvements of the preferred form of my invention;

Fig. 2 is an enlarged section of a valve employed in connection therewith;

Fig. 3 is a similar view of a float controlled vent for use in the measuring container;

Fig. 4 is a perspective view of a modified form of my invention; and

Fig. 5 is an enlarged section of the controlling valve employed in connection therewith.

Referring more particularly to the drawings, and specifically to Figs. 1 to 3, wherein similar characters of reference designate like and corresponding parts, I provide a supply tank 10, which in the present instance is disposed underground. My improved liquid dispenser will be found particularly desirable for use in dispensing gasolene, kerosene, oil and other volatile liquids and I will therefore describe the same as adapted for this purpose. The main supply tank must, for obvious reasons, be located underground.

A filling conduit 11 extends above the surface of the ground, said conduit 11 communicating with the tank. A platform 12 is mounted on the surface of the ground over the tank, the conduit 11 projecting through said platform and having a closure cap 13 thereon. A main supply conduit 14 extends from the bottom portion of one end of the tank 10 and passes upwardly through the platform 12 whereat branches 15 and 16 are connected thereto, these branches being connected to the lower portions of the measuring containers 19 and 20 by means of multi-way valves 17 and 18, the containers being of different sizes to allow the obtaining of different combinations of liquid measures. A service pipe P is tapped into the conduit 14 and preferably extends into a building or like structure, not shown, but which is arranged in proximity to the dispensing device, thereby permitting the contents thereof to be drawn by persons in such building.

Float controlled vents 21 and 22 are provided at the upper ends of the containers 19 and 20, while a discharge conduit 23 is connected to the discharge portions of the multi-way valves 17 and 18 and preferably is provided with a hose or similar flexible conduit 24 in order that the liquid contents of the containers may be conveyed to any point desired, such for instance, as to facilitate the filling of the fuel tank of an automobile. Although no means has been shown in the drawings to support the containers 19 and 20, it is of course to be understood that any suitable form of structure may be provided for this purpose, such as conditions or preference may dictate. Also, if desired, the containers may be housed in a suitable manner, such as common in the art.

In order to elevate the contents of the tank 10 to the measuring containers, I provide an air pump 25, the same having connection with the tank 10 by means of a conduit 26 tapped into the filling pipe 11. This pump is shown to be of the ordinary manually operated type, but, if desired, can be replaced by a power operated or automatic pump.

The conduit 26 is extended upwardly as at 27 between the several containers 19 and 20 and has a suitable form of air gage 28 connected to its upper end, while substantially right angularly disposed pipes 29 are branched from the upper portion thereof and engaged with the upper portions of said containers; valves 30 being interposed in said pipes to allow the passage of air to their respective containers to be controlled at the will of an operator. These conduits 29 serve to admit air to the upper portions of the tanks 19 and 20 when quick discharge of their liquid contents is desired, as hereinafter more fully described.

In the Fig. 2 I have illustrated the preferred form of valve for use in connection with the herein shown embodiment of my invention, one of these valves being connected to each of the containers 19 and 20 as clearly shown in Fig. 1. For the purpose of convenience, however, description of but one of these valves will be given, it being borne in mind that the construction of the two is identical. The casing of the valve 17 communicates with the measuring container 19 through the medium of a short conduit 32 arranged at substantially right angles to the supply conduit 15. A second short conduit 33 is extended from the valve casing at a point diametrically opposite the conduit 32 and serves as the discharge portion of nozzle of the valve, this nozzle engaging with the discharge conduit 23. The valve proper 34 arranged in the casing is of the usual turning plug type and is formed with three ways, the branch ways 35 being so arranged as to, at times, effect communication between the conduit 15 and the conduit 32, and at other times to establish communication between the conduit 32 and the discharge nozzle 33 of the valve casing. To facilitate the rotation of the valve proper, a handle 37 or like element may be connected thereto in a suitable manner.

The float controlled vents hereinbefore mentioned, each consist of a closure plug 38 having tapered sides and being carried on a rod 39; a float 40 being engaged with the under or lower side of said plug 38. A screw threaded cap 41 is turned into engagement with the screw threaded neck portion extending upwardly from each of the containers and serves as an effectual casing for the closure plug or valve arranged therein, the upper portion or top of the cap having a centrally located tapered opening formed therein in which the plug or valve 38 is adapted to seat whereby to prevent the admission of air to the particular container communicating therewith and also to prevent the escape of air from this container. It will be noted, that due to the provision of the float controlled vent, means are provided for closing the vent openings occurring in the upper portions of each of the containers and in consequence, the overfilling and resultant wasting of fluid from the containers is prevented.

An annular flange 41' is formed about the openings in the upper portions of the several containers 19 and 20 and support thereon a circular member R, which has secured to the under side thereof a perforate cage C, said cage being normally closed by means of a closure c hinged to one portion of the member R and adapted to fit in the centrally located opening formed therein. To lock the closure c in its position in the opening in the member R and to prevent tampering with the contents of the cage C by unauthorized persons, suitable keepers or eyelets may be and preferably are arranged on portions of the ring R and the closure c and are adapted to receive a wire therethrough, which in turn has the free ends thereof engaged by an ordinary form of lead seal or its equivalent. Through the provision of one the cages C in each of the containers 19 and 20, the fluid capacity of said containers may be accurately regulated by dropping glass balls or similar solids into the same to vary the displacement of liquid. The number of balls dropped into the cages depends, of course, entirely upon the degree of adjustment of the fluid capacity of the several containers necessary. When proper adjustments of the fluid capacities of the several containers have been made, the closures c of their respective cages C can be then sealed by an attendant or so called "inspector."

In operation, the pump 25 is operated to cause the discharge of air from the same through the conduits 26 and 11 into the tank 10, thus effecting the elevation of the liquid contained therein through the conduit 14 whereupon it is discharged into the branch conduits 15 and 16 connected to the upper end thereof. To fill the container 19, the rotatable valve plug is moved to the position as shown in the Fig. 2, the liquid then flowing from the branch 15 through the valve plug into the conduit 32 and from there into the lower portion of the container 19. The level of the liquid in the container will be gradually raised and can be accurately determined by reason of the transparent walls of the container. To dispense the liquid contents of the container 19 by gravity, it is seen that the valve 30 interposed in the pipe 29 communicating therewith and with the upper portion 27 of the conduit 26 is closed, whereupon, the valve 34 is rotated to establish communication between the conduit 32 and the discharge portion 33 of the valve casing 17, allowing the liquid to flow from the container 19 into the discharge conduit 23 and through the hose 24 into the receiving vessel. The amount of liquid dispensed from the container can of course be accurately gaged by watching the lowering of the level in the transparent container. When the desired amount of liquid has been discharged from the container, the valve 34 may be then moved to its closed position. When the valve 34 is moved to discontinue the flow of liquid from the container 19, it is positioned so that certain of the ways establish communication between the branch 15 and the conduit 32 in order that the supply of liquid in the tank will be replenished. When the supply has been replenished the ways of the valve may then be disalined with adjacent ends of the conduits 15, 32 and 33.

Should it be desired to effect a rapid discharge of liquid from either of the containers 19 or 20, the valves 30 in the pipes 29 are opened, thereby permitting the passage of air under pressure into the upper portions of said containers. The inflowing air will of course engage and move the floats 40 upwardly, causing the plugs or closures 38 to which the same are attached to be engaged in and close the openings 42 so that there will be no loss of pressure through these vents. Due to the pressure on the liquid contents of the several tanks, the same will be caused to flow more rapidly therefrom upon the opening of their respective discharge nozzles.

In Fig. 4, I have illustrated a modified form of my invention, the supply tank being designated 43 and having a main supply conduit 44 extending from the lower portion thereof. The measuring containers are shown and designated 45 and 45′ and are preferably formed of transparent material and connected with the conduit 44 through the medium of suitable conduits and valves hereinafter described. Other valves 46 of the turning plug type are arranged upon the upper portions of the several containers and communicate therewith and are provided with upright vent tubes 47. To support that portion of the conduit 44 directly above the containers 45 and 45′, a bracket 48 may be and preferably is engaged therewith and is secured to some suitable fixed object.

An enlarged sectional view of one of the valves 46 is shown in the Fig. 5, the casing of said valve being provided with a short conduit 50, whereby communication between the same and its respective container may be established. A nipple is formed on the casing at a point diametrically opposite the conduit 50 and receives the lower extremities of the several vent tubes 47. The valve proper, as above stated, is of the turning plug type and is designated 51, a diametrical bore or way being formed therein, one portion of which is enlarged as at 53. A vent opening 56 is formed in the casing adjacent the connection with the metal vent tube and obviously, serves to permit the inflow of air and the dispensing of the fluid from the container and communication with the vent tube 47 is discontinued. A multi-way valve 57 is connected to each of the containers 45 and 45′ adjacent their lower extremities and are in turn connected to the supply conduit 44. The valves 57 are of the turning plug type, the plug being provided with two ways, which ways are so arranged as to permit the establishing of communication between the supply conduit 44 and the several containers 45 and 45′ and then to discontinue the communication between the supply conduit and the containers and establish communication between the containers and the discharge opening of the valve whereby to discharge the fluid therefrom.

In this form of my invention, to determine the fluid level in the supply tank 43, there is engaged with the said tank a fluid gage 58.

With a view toward providing means whereby the valves 57 and 46 may be operated simultaneously to permit the filling of the containers 45 and 45′ and the dispensing of the fluid therefrom when desired, I provide vertically disposed rods 59, the lower extremities of which are engaged with the plugs of each of the valves 57, while the upper extremities thereof have arms 60 fixedly secured to the same. Brackets 61, having suitable bearing collars formed therein, receive the upper extremities of the rods 59 and have their remaining ends formed with apertured feet in order that the same may be secured to some fixed object. A connecting rod 62 is pivotally connected to the free extremity of each of the arms 60 and extends into engagement with the operating handle of each of the valves 46, while to operate the plugs of the several valves, a handle 63 is arranged upon each of the vertical rods 59. To operate one set of the valves 46 and 57, the handle 63 is moved outwardly to cause the alining of the way in the plug 51 of the valve 46 with the vent tube 47 and the short conduit 50 and also cause the alining of the proper ways in the valve 57 with the supply conduit 44 and the intake opening of the particular container engaged thereby. Thus, the container may be readily filled to the desired height. To dispense fluid from the container, the handle 63 is moved outwardly in a different direction, after moving the same to an intermediate or inoperative position, causing the way in the plug 51 to be disalined with the vent tube 47 and alining the same with the vent opening 56. By reason of the enlarged portion 53, the lower portion of the way will still be in communication with the short conduit 50, thereby, allowing the necessary ingress of air. Simultaneous with the movement of the plug 51, the turning plug in the valve 57 is moved out of alinement with the conduit 44, establishing communication between the container and the discharge portion of the said valve, hence, permitting the flow of the fluid therefrom. In this connection, it is to be understood that the container is normally filled with the fluid to be dispensed thereby in order that it will be ready for operation at all times and after the amount of liquid as drawn or dispensed thereby may be accurately gaged by viewing the graduations as arranged upon the same together with the descent of the liquid. Obviously, the vent tube 47 serves as means for permitting the exhaustion of air from the containers during the filling operation and it is to be noted, that the upper extremity of the same extends above the top of the storage tanks 43 in order that they will not overflow.

I desire to have it understood that each of the containers 45 and 45′ may be and preferably are provided with my improved regulating cages, such as shown in the preferred form of the invention and designated by the reference letter C. Further, I desire to have it understood that the positioning of the fluid gage as arranged upon the supply tank 43 may be changed and that the same may be placed upon the discharge conduit 44 at any suitable point throughout its length, such as conditions or preference may dictate. To fill the containers 45 and 45′, the multi-way valves 57 connected to each of the same are turned to positions to establish communication between the containers and the branches of the pipe 44. When the same are filled, the valves are moved to closed positions and the device is ready for dispensing operations.

It will be apparent that by using the containers 19 and 20 in various combinations a wide range of measurement may be obtained by reason of the relative size of the containers and the manner in which the containers 20 and 45′ are graduated, such measurement being absolutely accurate since there will be practically no adhesion of the liquid to the inside surfaces of the said measuring containers. The same may be said of the container shown in the modified form of my invention. In the form shown in the drawings, the containers are mounted on the side of a street whereby persons desiring to purchase quantities of liquid for motor vehicles and the like may replenish their supply tank without entering a building. The building service pipe hereinbefore referred to is shown in Fig. 1 and designated P.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

I claim:

1. A pre-determined bulk liquid dispenser comprising a storage tank, a measuring vessel, a conduit between the tank and said vessel at the bottom portion of the latter, a valve in said connection adjacent the bottom of the vessel to permit the discharge into the latter of the liquid from the tank or to cut off communication between the tank and the vessel to permit the discharge of the liquid from the vessel, and a vent valve associated with the top portion of the vessel, said valve comprising a flange formed on the vessel, a cap detachably secured to said flange, a float within said flange and cap, said cap having an opening therein forming a valve seat, a valve carried by the float co-operating with said seat, said vessel adjacent to said flange being provided with an inwardly extending portion, a ring supported thereon and having a central opening, a sack supported by said ring adjacent to said central opening and a closure for said opening, said sack being designed to receive solids to vary the liquid capacity of said vessel.

2. In combination, a liquid dispensing apparatus, a receiving, measuring and dispensing vessel, said vessel discharging from its bottom, a vent in the upper portion of said vessel, and a cage arranged in said upper portion of the vessel for receiving solids to vary the liquid capacity of the vessel.

3. In combination, a liquid dispensing apparatus, a receiving, measuring and dispensing vessel, said vessel discharging from its bottom, an automatic float operated vent in the upper portion of said vessel, and a perforated cage supported in the upper portion of the vessel for receiving solids to vary the liquid capacity of said vessel.

4. In combination, a liquid dispensing apparatus, a receiving, measuring and dispensing vessel, said vessel discharging from its bottom, a chamber formed adjacent the upper portion of said vessel, a float movably arranged in the chamber, a valve carried by said float, said chamber having a seat therein for said valve communicating with the atmosphere, a perforate basket supported adjacent said chamber for receiving solids to vary the liquid capacity of said vessel, and means for closing said vessel and preventing tampering therewith.

5. A liquid dispensing apparatus including in combination, a tank, a measuring and dispensing vessel, a supply pipe extending from said tank into engagement with the vessel, means for supplying air under pressure to said tank, said means including a conduit, one end of which is extended upwardly into connection with the upper portion of said vessel, a valve interposed in said conduit adjacent its connection with the vessel, a chamber formed in the upper portion of said vessel, a float movably arranged in said chamber, a valve carried by said float adapted for engagement, at times, with a vent opening in the chamber communicating with the atmosphere, a foraminated cage supported in the upper portion of the vessel adjacent said chamber, and means for closing the open end of the cage and preventing tampering therewith, said cage being adapted to receive solids for varying the liquid capacity of the vessel.

In testimony whereof, I affix my signature hereto.

EDWARD GARVEY.